(12) United States Patent
Uemura et al.

(10) Patent No.: US 10,532,653 B2
(45) Date of Patent: Jan. 14, 2020

(54) TRACTOR

(71) Applicant: KOMATSU LTD., Tokyo (JP)

(72) Inventors: Takuya Uemura, Tokyo (JP); Taira Ozaki, Tokyo (JP); Masami Hirayama, Tokyo (JP)

(73) Assignee: KOMATSU LTD., Tokyo (JP)

( * ) Notice: Subject to any disclaimer, the term of this patent is extended or adjusted under 35 U.S.C. 154(b) by 120 days.

(21) Appl. No.: 15/554,032

(22) PCT Filed: Oct. 20, 2016

(86) PCT No.: PCT/JP2016/081089
§ 371 (c)(1),
(2) Date: Aug. 28, 2017

(87) PCT Pub. No.: WO2017/069194
PCT Pub. Date: Apr. 27, 2017

(65) Prior Publication Data
US 2018/0029464 A1 Feb. 1, 2018

(30) Foreign Application Priority Data
Oct. 23, 2015 (JP) .................................. 2015-208874

(51) Int. Cl.
*B60K 13/02* (2006.01)
*E02F 3/80* (2006.01)
(Continued)

(52) U.S. Cl.
CPC .............. *B60K 13/02* (2013.01); *B60K 11/06* (2013.01); *E02F 3/76* (2013.01); *E02F 3/80* (2013.01);
(Continued)

(58) Field of Classification Search
CPC ...... E02F 9/0866; B60K 13/02; F02M 35/164; B60Y 2200/411
See application file for complete search history.

(56) References Cited

U.S. PATENT DOCUMENTS 7,967,094 B2 * 6/2011 Matsushita ............ B62D 25/10
 180/69.2
8,191,668 B2 * 6/2012 Keane .................... B60K 13/04
 180/296
(Continued)

FOREIGN PATENT DOCUMENTS

JP 7-113251 A 5/1995
JP 7-150595 A 6/1995
(Continued)

OTHER PUBLICATIONS

The International Search Report for the corresponding international application No. PCT/JP2016/081089, dated Nov. 29, 2016.

*Primary Examiner* — Nicole T Verley
(74) *Attorney, Agent, or Firm* — Global IP Counselors, LLP

(57) ABSTRACT

A tractor includes an air cleaner and a passageway arranged to surround the air cleaner. Alternatively, tractor includes a maintenance equipment, an engine, a top plate covering the engine, and a floor section disposed at a position lower than the top plate and in a non-overlapping position with the engine as seen from above. In this tractor, the maintenance equipment is disposed on the floor section.

15 Claims, 5 Drawing Sheets

(51) Int. Cl.
  *E02F 9/00* (2006.01)
  *E02F 3/76* (2006.01)
  *F02M 35/16* (2006.01)
  *B60K 11/06* (2006.01)
(52) U.S. Cl.
  CPC .............. *E02F 9/00* (2013.01); *F02M 35/16* (2013.01); *F02M 35/164* (2013.01); *B60Y 2200/411* (2013.01)

(56) References Cited

U.S. PATENT DOCUMENTS

| | | | | |
|---|---|---|---|---|
| 8,418,678 | B2* | 4/2013 | Ochi | F02M 37/0076 123/516 |
| 9,206,774 | B2* | 12/2015 | Rieger | F02M 35/164 |
| 9,434,245 | B2* | 9/2016 | Mori | E02F 9/0808 |
| 9,453,482 | B2* | 9/2016 | Yokota | F02M 35/084 |
| 9,657,456 | B2* | 5/2017 | Aoyama | B60R 3/00 |
| 10,208,717 | B2* | 2/2019 | Iwamoto | F02M 35/10 |
| 2014/0291057 | A1 | 10/2014 | Nakagami et al. | |
| 2015/0369109 | A1* | 12/2015 | Mitsuda | E02F 9/0891 180/309 |
| 2016/0032562 | A1* | 2/2016 | Aoyama | B60R 3/00 180/68.3 |
| 2017/0321392 | A1* | 11/2017 | Oshikawa | E02F 9/0866 |
| 2019/0193554 | A1* | 6/2019 | Okazaki | B60K 13/02 |

FOREIGN PATENT DOCUMENTS

| | | | |
|---|---|---|---|
| JP | 2001-41042 A | | 2/2001 |
| JP | 2001073407 A | * | 3/2001 |
| JP | 2003-3517 A | | 1/2003 |
| JP | 2005-16083 A | | 1/2005 |
| JP | 5409971 B1 | | 11/2013 |
| WO | WO-2010050314 A1 | * | 5/2010 ............ B60K 13/04 |

* cited by examiner

TRACTOR

CROSS-REFERENCE TO RELATED APPLICATIONS

This U.S. National stage application claims priority under 35 U.S.C. § 119(a) to Japanese Patent Application No. 2015-208874, filed in Japan on Oct. 23, 2015, the entire contents of which are hereby incorporated herein by reference.

BACKGROUND

Field of the Invention

The present invention relates to a tractor to which a work implement can be attached.

One example of a tractor is a bulldozer. A bulldozer typically includes an air cleaner disposed in an engine compartment. For example, the air cleaner in the bulldozer according to Japanese Patent No. 5409971 is disposed above the engine.

SUMMARY

A bulldozer generally includes a smaller engine compartment in order to maintain a favorable line of sight for the operator. As a result, many devices are collected tightly in the engine compartment. In the bulldozer according to Japanese Patent No. 5409971, a radiator is disposed in front of the air cleaner and an exhaust processing device is disposed behind the air cleaner. As a result, there is a need to access the air cleaner from the side after opening an exterior cover for covering the engine compartment when performing maintenance on the air cleaner. Consequently, maintenance of the air cleaner is inconvenient.

The present description discloses a tractor in which the convenience for performing maintenance on maintenance equipment such as the air cleaner is improved.

A tractor according to a first aspect of the present invention includes an air cleaner and a passageway arranged to surround the air cleaner.

The tractor may further include a vehicle body, an excavating blade, and an engine. The vehicle body may have the passageway on the inside thereof. The excavating blade may be provided in front of the vehicle body. The engine may be disposed rearward of the excavating blade and forward of the vehicle body. The vehicle body may further include, on the inside thereof, an engine compartment that contains the engine. The air cleaner and the passageway may be disposed rearward of the engine compartment.

The passageway may include a first passageway section that extends in the vehicle width direction on a first side in the front-rear direction of the vehicle. The tractor may further include a first equipment disposed on the first side of the first passageway section.

The passageway may further include a second passageway section that extends in the front-rear direction of the vehicle on a second side in the left-right direction of the vehicle. The tractor may further include a second equipment disposed on the second side of the second passageway section.

The first passageway section and the second passageway section may be connected.

The passageway may further include a third passageway section that extends in the vehicle width direction on a third side that is opposite the first side. The tractor may further include a third equipment disposed on the third side of the third passageway section.

The third passageway section may be connected with the second passageway section.

The tractor may further include a climbing member with which a worker can ascend or descend in order for the worker to enter the passageway. The air cleaner may be disposed near the climbing member.

The tractor may further include a cover member for covering the air cleaner. An air intake opening of the air cleaner may be positioned lower than the cover member.

The tractor may further include a vehicle body and an excavating blade. The vehicle body may have the passageway in the inside thereof. The excavating blade may be positioned forward of the vehicle body.

A tractor according to a second aspect of the present invention includes a maintenance equipment, an engine, a top plate, and a floor section. The top plate covers the engine. The floor section is provided at a position lower than the top plate and in a non-overlapping position with the engine as seen from above. The maintenance equipment is provided on the floor section.

The maintenance equipment may be an air cleaner for sending air to the engine.

The tractor may include a work area that faces the maintenance equipment on the floor section and into which a worker can enter.

The work area may be surrounded by a plurality of equipment.

The tractor may further include a climbing member with which a worker can ascend or descend in order for the worker to enter the work area. The maintenance equipment may be disposed near the climbing member.

The tractor may further include a cover member for covering the maintenance equipment. An air intake opening of the maintenance equipment may be positioned lower than the cover member.

The height of the top plate may be approximately the same as the height of the cover member.

The tractor may further include a vehicle body and an excavating blade. The vehicle body may contain an engine and the maintenance equipment. The excavating blade may be positioned forward of the vehicle body.

The tractor according to the first aspect includes the passageway arranged to surround the air cleaner. As a result, a worker is able to enter the passageway and access the air cleaner from a plurality of directions. Consequently, convenience for performing maintenance on the air cleaner is improved.

The tractor according to the second aspect includes the maintenance equipment that is disposed on the floor section lower than the top plate of the engine compartment and in a position that does not overlap the engine as seen from above. Specifically, the maintenance equipment is disposed on the floor section outside of the engine compartment where multiple pieces of equipment are collected. Therefore, a worker is able to work on the floor section where the pieces of equipment are not collected. Consequently, convenience for performing maintenance on the maintenance equipment is improved.

DETAILED DESCRIPTION OF EMBODIMENT(S)

Figure 1:
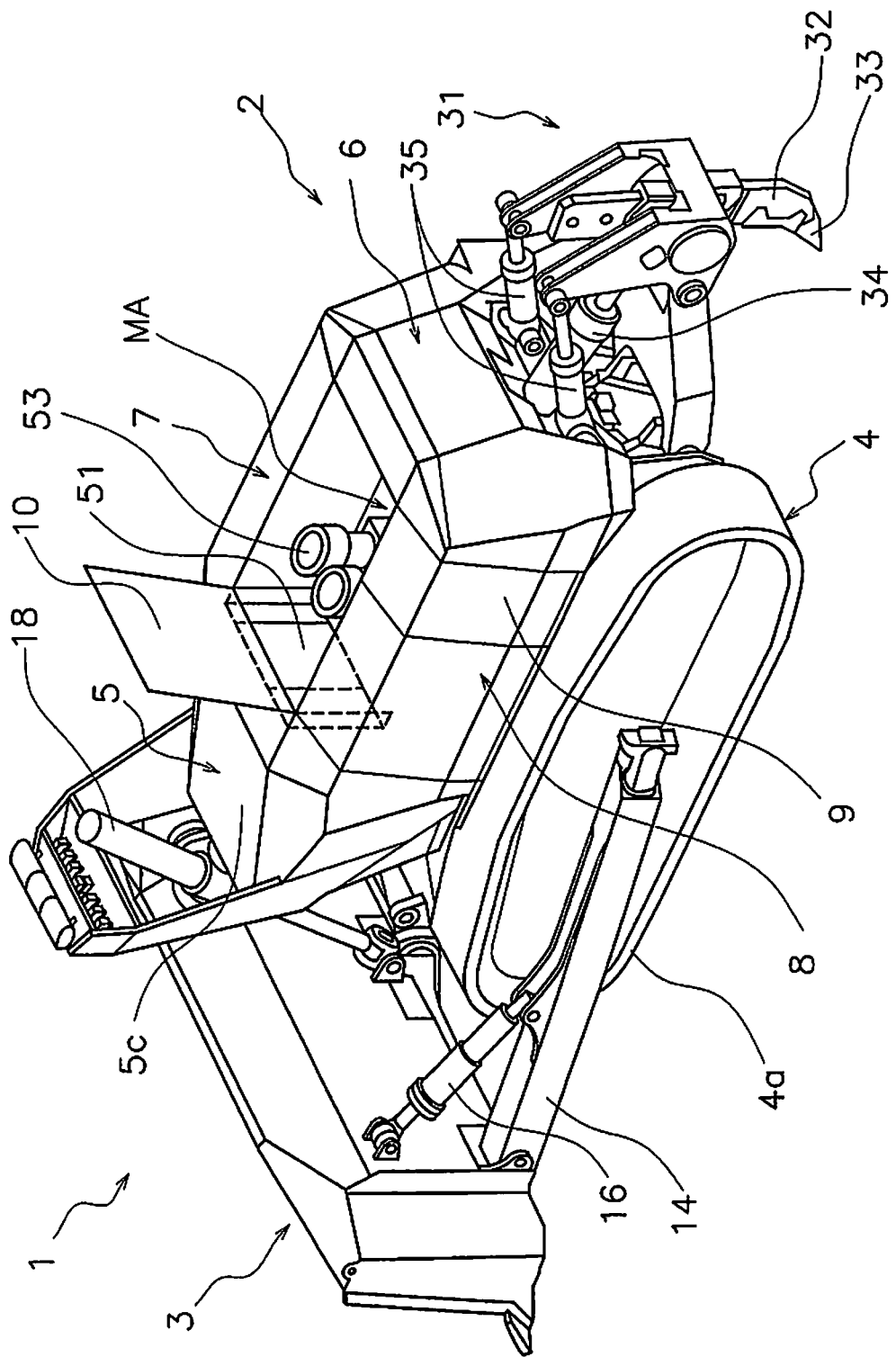
FIG. 1 is a perspective view of a work vehicle according to an embodiment.
Figure 2:
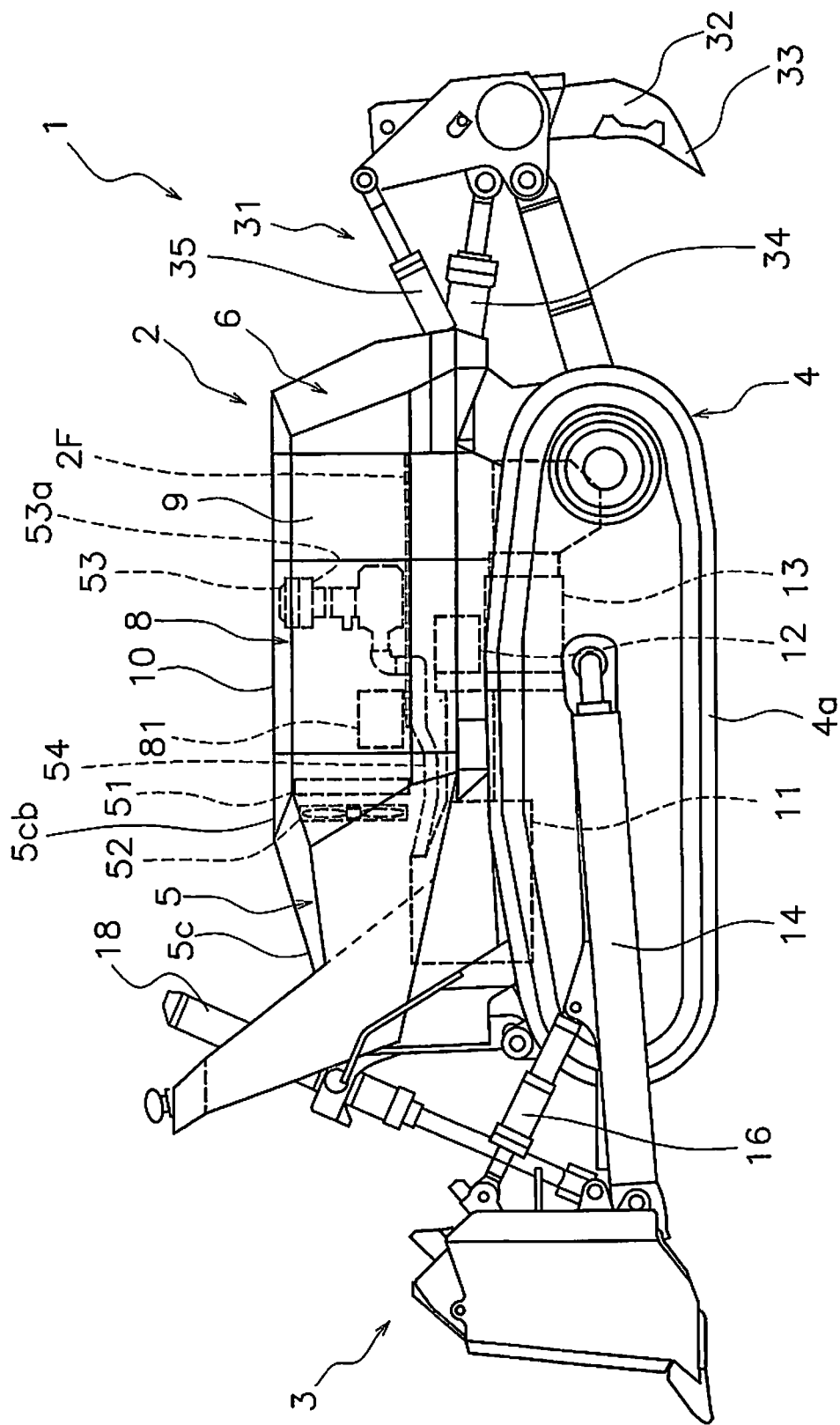
FIG. 2 is side view of the work vehicle.
Figure 3:
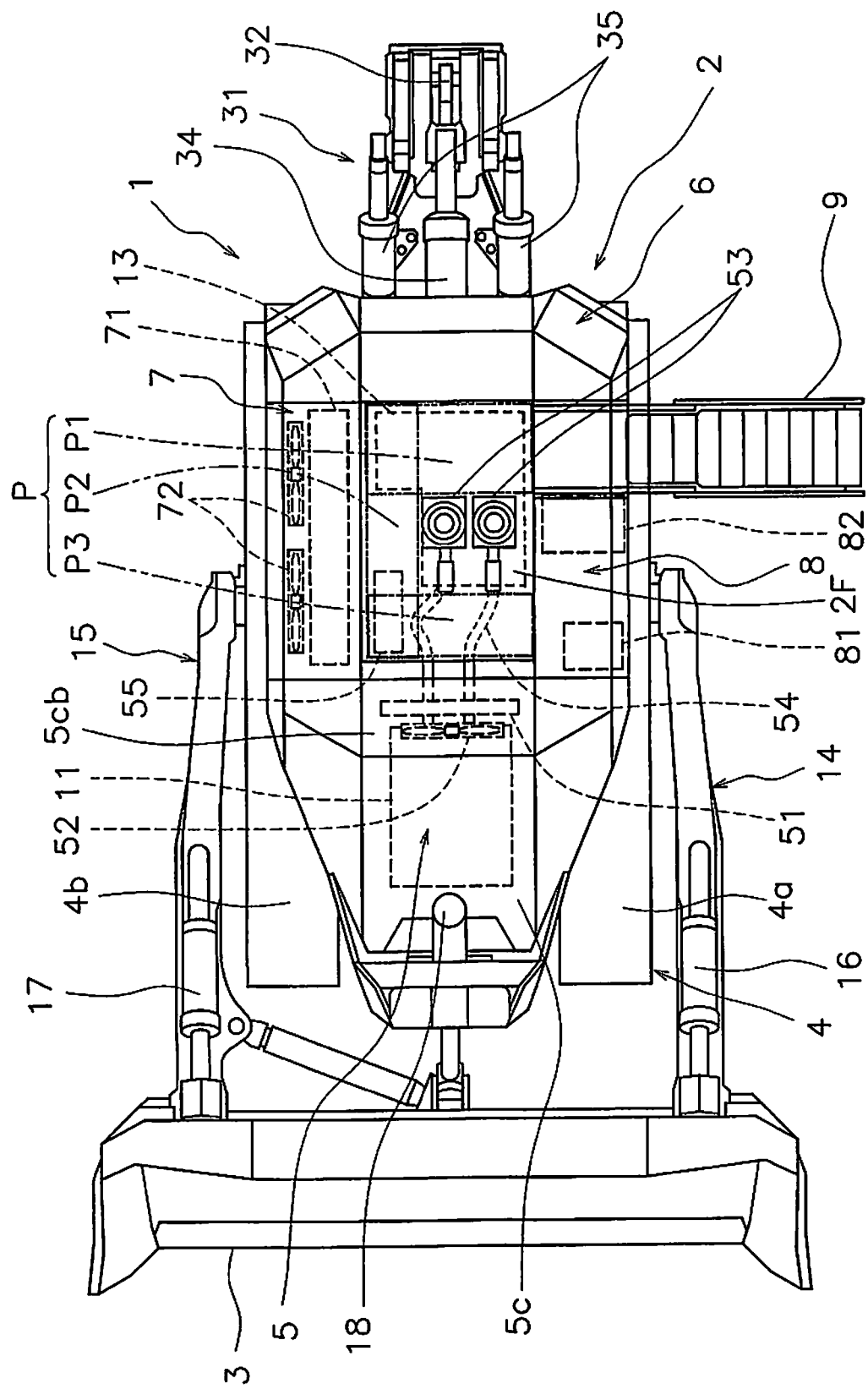
FIG. 3 is top view of the work vehicle.

The following is a description of a work vehicle 1 according to an embodiment with reference to the drawings. FIG. 1 is a perspective view of the work vehicle 1 according to the present embodiment. FIG. 2 is a side view of the work vehicle 1. FIG. 3 is a top view of the work vehicle 1. The work vehicle 1 is depicted while a below mentioned ladder device 9 is open in FIG. 3. Moreover, a below mentioned cover member 10 is omitted in FIG. 3.

Figure 4:
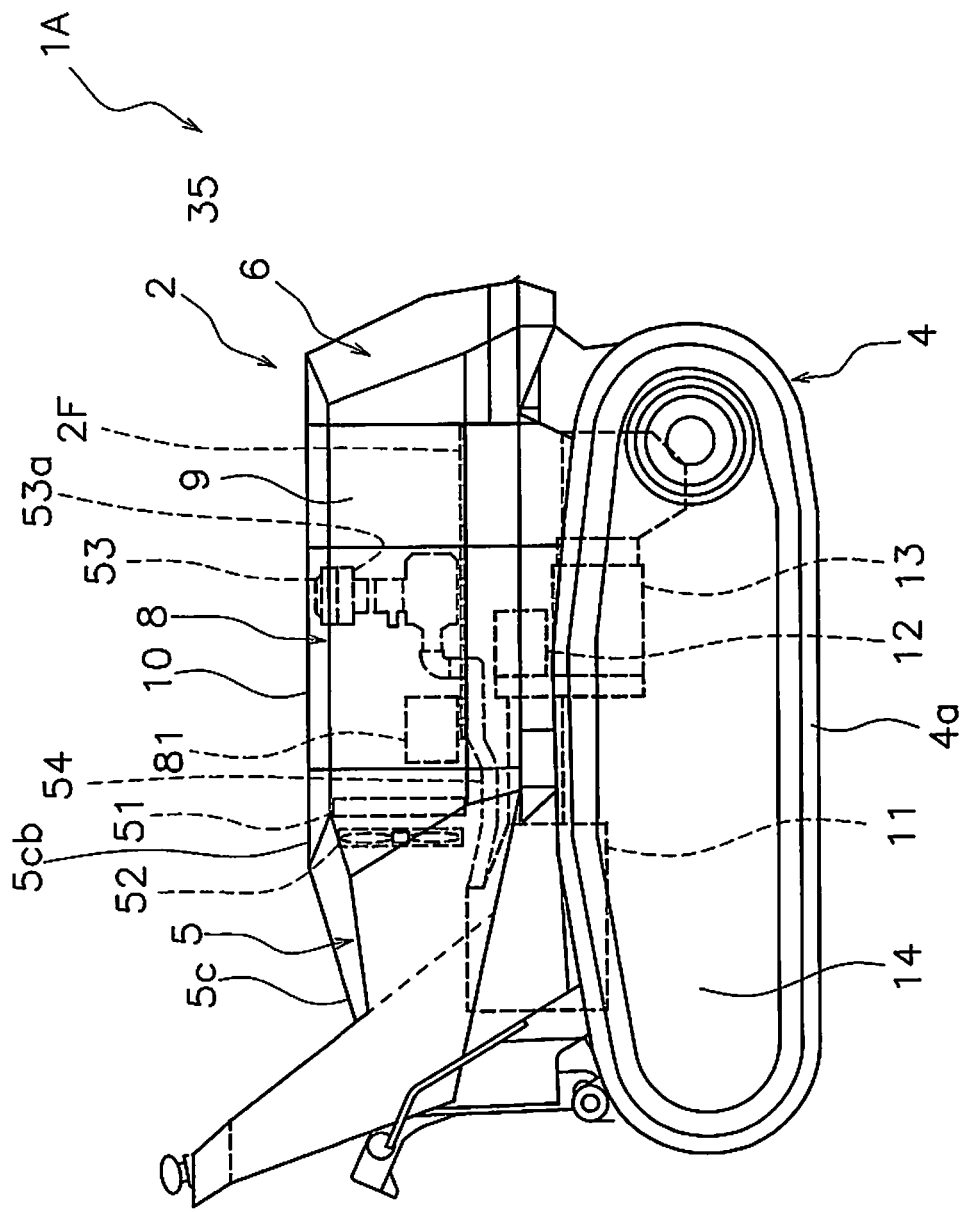
FIG. 4 is side view of a tractor.

The work vehicle 1 is a bulldozer in the present embodiment. The work vehicle 1 is a vehicle that is not provided with an operator cab in the present embodiment. As discussed below, the work vehicle 1 can be operated remotely. The work vehicle 1 includes a vehicle body 2, a work implement 3, and a ripper device 31. In the present embodiment, the work vehicle 1 with the work implement 3 and the ripper device 31 removed is referred to as a tractor 1A. FIG. 4 is a side view of the tractor 1A.

The vehicle body 2 includes a travel device 4 and an engine compartment 5. The travel device 4 is a device for causing the work vehicle 1 to travel. The travel device 4 includes crawler belts 4a and 4b. The crawler belt 4a is mounted on the left side portion of the vehicle body 2. The crawler belt 4b is mounted on the right side portion of the vehicle body 2. The work vehicle 1 travels due to the crawler belts 4a and 4b being driven.

The front direction in the present embodiment signifies the direction in which the work implement 3 is disposed on the vehicle body 2 when the work implement 3 is attached to the vehicle body 2, and the rear direction signifies the opposite direction. Left and right signify the left and right directions when facing toward the aforementioned front. The left-right direction may be paraphrased as the vehicle width direction.

The engine compartment 5 is disposed forward of the vehicle body 2. The engine compartment 5 is disposed forward of the center in the front-rear direction of the vehicle body 2. The vehicle body 2 includes the engine compartment 5 on the inside. The engine compartment 5 is disposed forward of the center in the front-rear direction of the vehicle body 2. The engine compartment 5 contains an engine 11, a first cooling device 51, and a first fan 52. That is, the engine 11, the first cooling device 51, and the first fan 52 are disposed in the front portion of the vehicle body 2. The engine 11, the first cooling device 51, and the first fan 52 are disposed forward of the center in the front-rear direction of the vehicle body 2. The engine 11, the first cooling device 51, and the first fan 52 are disposed forward of the center in the front-rear direction of the vehicle body 2. The vehicle body 2 contains the engine 11, the first cooling device 51, and the first fan 52.

The engine 11 generates driving power for driving the travel device 4. Air taken in by a below mentioned air cleaner 53 is sent to the engine 11. The first cooling device 51 is, for example, an after-cooler of the engine 11. The first fan 52 produces cooling air for the first cooling device 51. The first cooling device 51 is disposed behind the engine 11. The first fan 52 overlaps the rear end of the engine 11 as seen from above. The first cooling device 51 and the first fan 52 are disposed higher than the engine 11.

The engine compartment 5 is covered by a top plate 5c. The top plate 5c covers the engine 11, the first cooling device 51, and the first fan 52. The top plate 5c is disposed in the front portion of the vehicle body 2. The top plate 5c is disposed forward of the center in the front-rear direction of the vehicle body 2.

The vehicle body 2 includes a rear housing portion 6, a right housing portion 7, a left housing portion 8, and the ladder device 9. As illustrated in FIG. 1, the engine compartment 5, the rear housing portion 6, the right housing portion 7, the left housing portion 8, and the ladder device 9 are disposed to surround a work area MA. The engine compartment 5 is disposed in front of the work area MA. The rear housing portion 6 is disposed behind the work area MA. The right housing portion 7 is disposed to the right of the work area MA. The left housing portion 8 and the ladder device 9 are disposed to the left of the work area MA.

The rear housing portion 6 is, for example, a fuel tank that stores fuel for the engine 11.

As illustrated in FIG. 3, a second cooling device 71 and a second fan 72, for example, are disposed in the right housing portion 7. The second cooling device 71 is, for example, a radiator that cools a cooling medium for cooling the engine 11. The second cooling device 71 may further include an oil cooler that cools hydraulic fluid. The second fan 72 produces cooling air for the second cooling device 71. A door (not illustrated) for opening and closing the right housing portion 7 is provided facing the work area MA on the right housing portion 7. A worker is able to access the inside of the right housing portion 7 from the work area MA by opening the door of the right housing portion 7.

As illustrated in FIG. 3, a battery 81 and a hydraulic fluid tank 82 are disposed, for example, in the left housing portion 8. However, the items housed in the housing parts 6 to 8 are not limited to the above items and may be changed. The ladder device 9 is a climbing member with which a worker can ascend and descend in order to enter the work area MA. The ladder device 9 can be switched between a stored state and a deployed state. FIGS. 1 and 2 illustrate the ladder device 9 in the stored state. FIG. 3 illustrates the ladder device 9 in the deployed state.

When referring to FIG. 2, the vehicle body 2 further includes a hydraulic pump 12, a power transmission device 13, the air cleaner 53, a pipe 54, and a floor section 2F. The vehicle body 2 further contains the hydraulic pump 12, the power transmission device 13, the air cleaner 53, and the pipe 54. The power transmission device 13 is connected to the engine 11 and transmits driving power generated by the engine 11 to the travel device 4. The power transmission device 13 includes, for example, a transmission, a torque converter, and a steering device. The hydraulic pump 12 is driven by the driving power from the engine 11. Hydraulic fluid discharged by the hydraulic pump 12 is supplied to various members (for example, clutches of the transmission, clutches of the steering mechanism, and brakes) of the power transmission mechanism 13 via a control valve which is not illustrated.

The floor section 2F is disposed above the hydraulic pump 12 and the power transmission device 13. The floor section 2F is provided at a position lower than the top plate 5c and in a position that does not overlap the engine 11 as seen from above. The floor section 2F is disposed behind the engine compartment 5. The air cleaner 53 that sends purified air to the engine 11 is provided on the floor section 2F. The air cleaner 53 includes a filter that requires periodical replacement. The air cleaner 53 is a maintenance equipment that requires periodical replacement work for replacing the filter.

The maintenance equipment may also be an oil filter. The pipe 54 for sending air taken in by the air cleaner 53 to the engine 11 is provided between the air cleaner 53 and the engine 11. The pipe 54 passes below the floor section 2F between the air cleaner 53 and the engine 11.

The work area MA is an area facing the air cleaner 53 on the floor section 2F. The area of the floor section 2F excluding the air cleaner 53 forms a passageway P that surrounds the air cleaner 53. That is, the vehicle body 2 includes the passageway P on the inside thereof. The passageway P includes a first passageway section P1, a second passageway section P2, and a third passageway section P3. In the present embodiment, the side on which the first passageway section P1 is positioned with respect to the air cleaner 53 in the vehicle front-rear direction is referred to as a first side, and the side opposite thereof is referred to as a third side. Moreover, the side on which the second passageway section P2 is positioned with respect to the air cleaner 53 in the vehicle left-right direction is referred to as a second side, and the side opposite thereof is referred to as a fourth side. In the examples depicted in FIGS. 1 to 3, the first side is the rear side, the second side is the right side, the third side is the front side, and the fourth side is the left side. However, the first side and the third side may be reversed, and the second side and the fourth side may be reversed.

The first passageway section P1 extends in the vehicle width direction on the first side of the air cleaner 53. The second passageway section P2 extends in the vehicle front-rear direction on the second side of the air cleaner 53. The third passageway section P3 extends in the vehicle width direction on the third side of the air cleaner 53. The first passageway section P1 and the second passageway section P2 are connected. The second passageway section P2 and the third passageway section P3 are connected.

The ladder device 9 is positioned on the first side of the left housing portion 8. The first passageway section P1 is adjacent to the ladder device 9 as seen from above. The air cleaner 53 is disposed near the ladder device 9. Therefore, a worker can enter the passageway P through the ladder device 9. The first passageway section P1 is sandwiched between the air cleaner 53 and the fuel tank 6. The air cleaner 53 and the hydraulic fluid tank 82 are disposed on the third side of the first passageway section P1 and are adjacent to the first passageway section P1. The fuel tank 6 is disposed on the first side of the first passageway section P1 and is adjacent to the first passageway section P1. Therefore, a worker is able to perform maintenance on the air cleaner 53 and supply oil to the fuel tank 6 and the hydraulic fluid tank 82 by entering the first passageway section P1.

Moreover, the power transmission device 13 is disposed below the first passageway section P1. A hatch (inspection port) that can be opened and closed in order to access the power transmission device 13 is provided in the first passageway section P1. Therefore, a worker is able to perform maintenance on the power transmission device 13 by opening the hatch.

The second passageway section P2 is sandwiched between the air cleaner 53 and the second cooling device 71. The air cleaner 53 is disposed on the fourth side of the second passageway section P2 and adjacent to the second passageway section P2. The second cooling device 71 is disposed on the second side of the second passageway section P2 and adjacent to the second passageway section P2. Therefore, a worker is able to perform maintenance on the air cleaner 53 and the second cooling device 71 by entering the second passageway section P2. The second passageway section P2 may also be provided with a hatch (inspection port) that can be opened and closed for accessing the hydraulic pump 12 and the like.

The third passageway section P3 is sandwiched between the air cleaner 53 and the first cooling device 51. The first cooling device 51 is disposed on the third side of the third passageway section P3 and is adjacent to the third passageway section P3. The air cleaner 53 is disposed on the first side of the third passageway section P3 and adjacent to the third passageway section P3. The battery 81 is disposed on the fourth side of the third passageway section P3 and adjacent to the third passageway section P3. Therefore, a worker is able to perform maintenance on the air cleaner 53, the first cooling device 51, and the battery 81 by entering the third passageway section P3.

A filter 55 is disposed below the third passageway section P3. That is, the vehicle body 2 includes the filter 55. A hatch (inspection port) that can be opened and closed in order to access the filter 55 is provided in the third passageway section P3. Therefore, a worker is able to perform maintenance on the filter 55 by opening the hatch.

The cover member 10 is disposed above the work area MA. The cover member 10 is disposed in a manner that allows opening and closing of the work area MA. The cover member 10 is depicted as open in FIG. 1 and the cover member 10 is depicted as closed in FIGS. 2 and 4. When referring to FIG. 2, the cover member 10 covers the air cleaner 53. An air intake opening 53a of the air cleaner 53 is positioned lower than the cover member 10. The height of the top plate 5c is approximately the same as the height of the cover member 10. The height of a rear end section 5cb of the top plate 5c is the same as the height of the cover member 10.

The work implement 3 is disposed in front of the vehicle body 2. The work implement 3 is disposed in front of the engine compartment 5. In the present embodiment, the work implement 3 is an excavating blade. The work implement 3 is supported by a left arm 14 and a right arm 15. One end of the left arm 14 is mounted on the left side portion of the vehicle body 2. The other end of the left arm 14 is attached to the back surface of the work implement 3. One end of the right arm 15 is mounted on the right side portion of the vehicle body 2. The other end of the right arm 15 is attached to the back surface of the work implement 3.

A left tilt cylinder 16, a right tilt cylinder 17, and a lift cylinder 18 are attached to the work implement 3. The left tilt cylinder 16 is attached to the left side portion of the vehicle body 2. The right tilt cylinder 17 is attached to the right side portion of the vehicle body 2. The left tilt cylinder 16 and the right tilt cylinder 17 are driven by hydraulic fluid from the hydraulic pump 12. The left tilt cylinder 16 and the right tilt cylinder 17 cause the work implement 3 to move to the left or right.

The lift cylinder 18 is attached to the center portion of the vehicle body 2 in the vehicle width direction. Only one lift cylinder 18 is provided in the work vehicle 1. The lift cylinder 18 is disposed in front of the engine compartment 5. The lift cylinder 18 is disposed behind the work implement 3. The lift cylinder 18 is driven by hydraulic fluid from the hydraulic pump 12. The lift cylinder 18 causes the work implement 3 to move up and down.

The ripper device 31 is disposed behind the vehicle body 2. The ripper device 31 is attached to a rear portion of the vehicle body 2. The ripper device 31 performs cutting and pulverizing with tractive force from the travel device 4 by piercing rocks and the like with a ripper tip 33 attached to the tip end of a shank 32 that faces substantially downward.

Moreover, the ripper device 31 is driven by hydraulic cylinders (ripper lift cylinder 34, ripper tilt cylinder 35).

Figure 5:
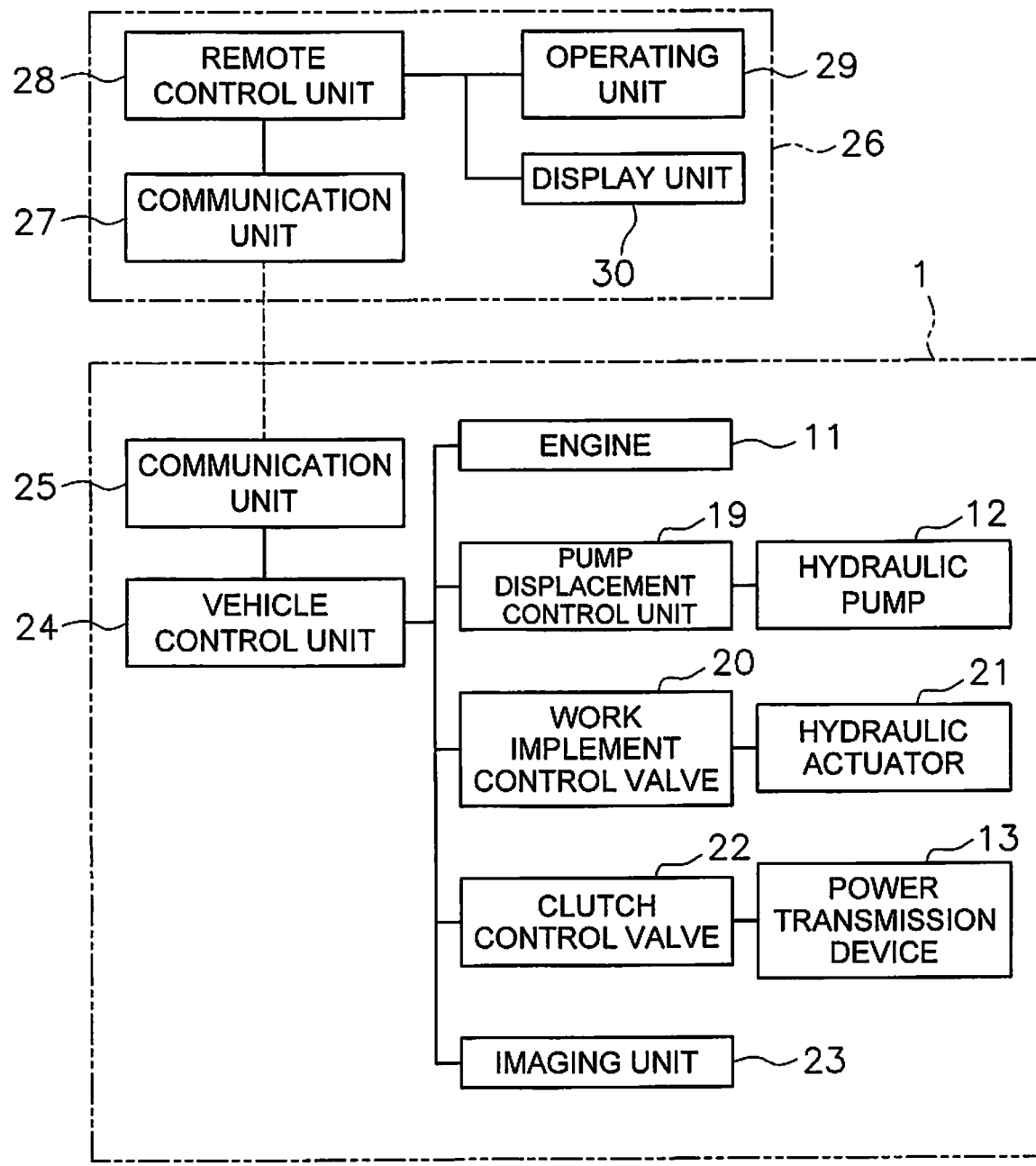
FIG. 5 is a block diagram of a control system for the work vehicle.

FIG. 5 is a block diagram of a control system for the work vehicle 1. As illustrated in FIG. 5, the work vehicle 1 includes the hydraulic pump 12 and a pump displacement control unit 19. The hydraulic pump 12 is driven by the engine 11 to discharge hydraulic fluid. The hydraulic pump 12 is a variable displacement pump and the pump displacement control unit 19 controls the discharge displacement of the hydraulic pump 12.

The work vehicle 1 includes a work implement control valve 20 and a hydraulic actuator 21. The hydraulic actuator 21 is driven by hydraulic fluid discharged from the hydraulic pump 12. For example, the hydraulic actuator 21 includes the abovementioned lift cylinder 18 and the left and right tilt cylinders 16 and 17 of the work implement 3. Further, the hydraulic actuator 21 includes the lift cylinder 34 and the tilt cylinder 35 of the ripper device 31. The work implement control valve 20 controls the supply and exhaust of the hydraulic fluid to and from the hydraulic actuator 21.

The work vehicle 1 includes the power transmission device 13 and a clutch control valve 22. The power transmission device 13 includes, for example, a transmission and a torque converter. The clutch control valve 22 controls the switching of a speed change clutch, a forward/reverse clutch, and a steering clutch and the like included in the power transmission device 13.

The work vehicle 1 includes an imaging unit 23. The imaging unit 23 captures images of the surroundings of the work vehicle 1 with a camera (not illustrated) attached to the work vehicle 1.

The work vehicle 1 includes a vehicle control unit 24 and a communication unit 25. The communication unit 25 is connected to an antenna (not illustrated) mounted on the vehicle body 2. The communication unit 25 carries out wireless communication with a communication unit 27 of a remote operating device 26. For example, the remote operating device 26 is disposed inside a management center away from the work site where the work vehicle 1 is used. Alternatively, the remote operating device 26 may be portable and may be disposed at the work site.

The vehicle control unit 24 is configured with a computation device such as a CPU, and a memory such as a RAM or a ROM or with a storage device such as a hard disk. The vehicle control unit 24 is programmed to control the work vehicle 1 on the basis of operation signals from the remote operating device 26. Moreover, the vehicle control unit 24 acquires image data acquired by the imaging unit 23 via wires or wirelessly. The vehicle control unit 24 transmits the image data captured by the imaging unit 23 to the communication unit 27 of the remote operating device 26 via the communication unit 25.

The remote operating device 26 includes a remote control unit 28 and an operating unit 29. The remote control unit 28 is configured with a computation device such as a CPU, and a memory such as a RAM or a ROM or with a storage device such as a hard disk.

The operating member 29 is operated by an operator for driving the work vehicle 1. For example, the operating unit 29 includes an acceleration operating device for adjusting the output of the engine 11. The operating unit 29 includes a work implement operating device for operating the work implement 3. The operating unit 29 includes a ripper operating member for operating the ripper device 31. The operating unit 29 includes a steering operating device for changing the traveling direction of the work vehicle 1 to the right and left. The remote control unit 28 transmits operation signals indicating the operating contents from the operating unit 29 to the communication unit 25 of the work vehicle 1 via the communication unit 27.

The remote operating device 26 includes a display unit 30. The display unit 30 is configured with a display such as a CRT, and an LCD, or an OELD. However, the display unit 30 is not limited to the aforementioned displays and may be another type of display.

The communication unit 27 of the remote operating device 26 receives the image data captured by the imaging unit 23 from the communication unit 25 of the work vehicle 1. The remote control unit 28 is programmed to display images indicating the surroundings of the work vehicle 1 on the basis of the image data captured by the imaging unit 23. For example, the remote control unit 28 may synthesize a bird's-eye view image from the images captured by the imaging unit 23 and display the bird's-eye view image on the display unit 30. Alternatively, the remote control unit 28 may display each of the images captured by the imaging unit 23 on the display unit 30.

The operator operates the operating unit 29 while viewing the display unit 30. As a result, the operation signals are transmitted from the communication unit 27 of the remote operating device 26 and the communication unit 25 of the work vehicle 1 receives the operation signals from the remote operating device 26. The vehicle control unit 24 controls the abovementioned engine 11, the pump displacement control unit 19, the work implement control valve 20, and the clutch control valve 22 and the like on the basis of the operation signals. As a result, the operator is able to operate the work vehicle 1 remotely.

The work vehicle 1 (tractor 1A) according to the present embodiment discussed above includes the air cleaner 53 and the passageway P arranged to surround the air cleaner. As a result, a worker is able to enter the passageway P and access the air cleaner 53 from a plurality of directions. Consequently, convenience for performing maintenance on the air cleaner 53 is improved.

The air cleaner 53 in the work vehicle 1 (tractor 1A) is disposed on the floor section 2F lower than the top plate 5c of the engine compartment 5 and in a position in which the air cleaner 53 does not overlap the engine 11 as seen from above. Specifically, the air cleaner 53 is disposed on the floor section 2F outside of the engine compartment 5 where multiple pieces of equipment are collected. Therefore, a worker is able to work on the floor section 2F where the pieces of equipment are not collected. Consequently, convenience for performing maintenance on the air cleaner 53 is improved.

The passageway P includes the first passageway section P1 that extends in the vehicle width direction on the first side of the air cleaner 53. The work vehicle 1 (tractor 1A) further includes the first equipment (fuel tank 6) disposed on the first side of the first passageway section P1. Therefore, a worker is able to access the first equipment from the first passageway section P1 as well as the air cleaner. As a result, convenience for performing maintenance on the work vehicle 1 (tractor 1A) is improved.

The passageway P includes the second passageway section P2 that extends in the front-rear direction on the second side of the air cleaner 53. The work vehicle 1 (tractor 1A) further includes a second equipment (second cooling device 71) disposed on the second side of the second passageway section P2. Therefore, a worker is able to access the second equipment from the second passageway section P2. As a result, convenience for performing maintenance on the work vehicle 1 (tractor 1A) is further improved.

The first passageway section P1 and the second passageway section P2 are connected. Therefore, a worker is able to enter the first passageway section P1 and the second passageway section P2 from one entrance (ladder device 9). As a result, convenience for performing maintenance on the work vehicle 1 (tractor 1A) is further improved.

The passageway P includes the third passageway section P3 that extends in the vehicle width direction on the third side of the air cleaner 53. The work vehicle 1 (tractor 1A) further includes a third equipment (first cooling device 51) disposed on the third side of the third passageway section P3. Therefore, a worker is able to access the third equipment from the third passageway section P3. As a result, convenience for performing maintenance on the work vehicle 1 (tractor 1A) is further improved.

The third passageway section P3 and the second passageway section P2 are connected. Therefore, a worker is able to enter the first passageway section P1 to the third passageway section P3 from one entrance (ladder device 9). As a result, convenience for performing maintenance on the work vehicle 1 (tractor 1A) is further improved.

The work vehicle 1 (tractor 1A) further includes the ladder device 9 for a worker to enter the passageway P. The air cleaner 53 is disposed near the ladder device 9. Therefore, it is easy to access the air cleaner 53 that has a high frequency of maintenance. Consequently, the convenience for performing maintenance on the air cleaner 53 is further improved.

The work vehicle 1 (tractor 1A) further includes the cover member 10 for covering the air cleaner 53. The air intake opening 53a of the air cleaner 53 is positioned lower than the cover member 10. Therefore, the possibility of dust produced during excavation work being sucked in by the suction opening 53a of the air cleaner 53 is reduced.

The work area MA that a worker can enter is provided in the work vehicle 1 (tractor 1A) facing the air cleaner 53 on the floor section 2F. Therefore, a worker is able to perform maintenance work in the work area MA facing the air cleaner 53. Therefore, convenience for performing maintenance on the work vehicle 1 (tractor 1A) is further improved.

The work area MA is surrounded by a plurality of equipment (the first cooling device 51, the second cooling device 71, the battery 81, the hydraulic fluid tank 82, and the fuel tank 6). Therefore, a worker is able to perform maintenance on the plurality of equipment as well as the air cleaner 53 by entering the work area MA. As a result, convenience for performing maintenance on the tractor is improved.

Although the embodiment of the present invention has been described so far, the present invention is not limited to the above embodiment and various modifications may be made within the scope of the invention.

The work vehicle 1 (tractor 1A) is not limited to a remotely operated vehicle and may be a manned work vehicle. Alternatively, an operator cab may be provided on the vehicle body in the same way as a manned work vehicle and a device that is the same as the remote operating device 26 may be provided inside the operator cab. Consequently, the operator is able to easily operate the work vehicle 1 while viewing the display image.

While the present embodiment discussed above depicts an example in which the ladder device 9 is disposed on the first side (rear side or front side) of the left housing portion 8, the ladder device 9 may be disposed on the first side of the right housing portion 7. The ladder device 9 may also be disposed at the rear end of the vehicle body 2. Furthermore, the ladder device 9 may be disposed on the second side (right side or left side) of the second passageway section P2.

The right housing portion 7 may not be provided with the door facing the work area MA and may not be provided with an exterior member in the location facing the work area MA. In this case, the second cooling device 71 is disposed while open to the work area MA.

According to the present invention, there is provided a tractor in which convenience for performing maintenance on maintenance equipment such as the air cleaner is improved.

The invention claimed is:

1. A tractor comprising:
a vehicle body;
an air cleaner;
a first equipment; and
a passageway arranged to surround the air cleaner, the passageway including a first passageway section that extends in a front-rear direction of the vehicle body on a first side of the air cleaner in vehicle width direction of the vehicle body, the vehicle width direction being perpendicular to the front-rear direction,
the first equipment being disposed on the first side of the first passageway section such that first passageway section is disposed between the first equipment and the air cleaner in the vehicle width direction.

2. The tractor according to claim 1, further comprising an excavating blade provided in front of the vehicle body; and
an engine disposed rearward of the excavating blade and forward of the vehicle body,
the vehicle body including the passageway inside of the vehicle body,
the vehicle body further including an engine compartment inside of the vehicle body, the engine compartment containing the engine, and
the air cleaner and the passageway being disposed rearward of the engine compartment.

3. The tractor according to claim 2, further comprising a second equipment,
the passageway including a second passageway section that extends in a vehicle width direction on a second side of the air cleaner in the front-rear direction, and
the second equipment being disposed on the second side of the second passageway section such that second passageway section is disposed between the second equipment and the air cleaner in the front-rear direction.

4. The tractor according to claim 3, wherein the first passageway section and the second passageway section are connected.

5. The tractor according to claim 3, further comprising a third equipment,
the passageway further including a third passageway section that extends in the vehicle width direction on a third side that is opposite the second side, and
the third equipment being disposed on the third side of the third passageway section.

6. The tractor according to claim 5, wherein the third passageway section is connected with the first passageway section.

7. The tractor according to claim 2, further comprising:
a top plate covering the engine; and
a floor section disposed at a position lower than the top plate and in a non-overlapping position with the engine as seen from above,
the air cleaner being disposed on the floor section.

8. The tractor according to claim 7, further comprising:
a work area into which a worker can enter, the work area being arranged to face the air cleaner.

9. The tractor according to claim 8, wherein
the work area is surrounded by a plurality of equipment, the plurality of equipment including the first equipment and the second equipment.

10. The tractor according to claim 8, further comprising
a climbing member usable by a worker to ascend or descend in order for the worker to enter the work area,
the air cleaner being disposed near the climbing member.

11. The tractor according to claim 7, further comprising
a cover member covering the air cleaner,
an air intake opening of the air cleaner being positioned lower than the cover member.

12. The tractor according to claim 11, wherein
a height of the top plate is approximately same as a height of the cover member.

13. The tractor according to claim 1, further comprising
a cover member covering the air cleaner,
an air intake opening of the air cleaner being positioned lower than the cover member.

14. A tractor comprising:
a vehicle body including a passageway and an engine compartment, the passageway and the engine compartment being inside the vehicle body;
an excavating blade provided in front of the vehicle body;
an engine disposed inside the engine compartment rearward of the excavating blade and forward of the vehicle body;
an air cleaner arranged in and surrounded by the passageway, the air cleaner and the passageway being disposed rearward of the engine compartment; and
a climbing member usable by a worker to ascend or descend in order for the worker to enter the passageway,
the air cleaner being disposed near the climbing member.

15. A tractor comprising:
a vehicle body including a passageway and an engine compartment, the passageway and the engine compartment being inside the vehicle body, the passageway including a first passageway section that extends in a vehicle width direction on a first side in a front-rear direction of the vehicle body and a second passageway section that extends in the vehicle width direction on a second side that is opposite the first side;
an excavating blade provided in front of the vehicle body;
an engine disposed inside the engine compartment rearward of the excavating blade and forward of the vehicle body;
an air cleaner arranged in and surrounded by the passageway, the air cleaner and the passageway being disposed rearward of the engine compartment;
a first equipment disposed on the first side of the first passageway section; and
a second equipment disposed on the second side of the second passageway section.

\* \* \* \* \*